United States Patent [19]

Kurzweil, Jr.

[11] 4,133,011
[45] Jan. 2, 1979

[54] SAMPLED DATA POSITIONING SYSTEM EMPLOYING A MODEL OF THE PHYSICAL SYSTEM FOR TIME OPTIMAL CONTROL

[75] Inventor: Fred Kurzweil, Jr., Saratoga, Calif.

[73] Assignee: International Business Machines Corporation, Armonk, N.Y.

[21] Appl. No.: 863,832

[22] Filed: Dec. 23, 1977

[51] Int. Cl.$^2$ .................. G11B 21/08; G05B 13/00
[52] U.S. Cl. .................. 360/78; 318/638; 318/653; 318/561
[58] Field of Search .................. 360/78, 77, 75, 76; 318/449, 561, 450, 647, 653, 638; 244/77M

[56] References Cited

U.S. PATENT DOCUMENTS

| | | | |
|---|---|---|---|
| 3,137,462 | 6/1964 | Hendrick | 244/77 |
| 3,221,229 | 11/1965 | Kezer et al. | 318/561 |
| 3,427,606 | 2/1969 | Black et al. | 360/78 |
| 3,601,588 | 8/1971 | Bristol | 235/150.1 |
| 3,657,534 | 4/1972 | DeClerk et al. | 250/59 |
| 3,758,762 | 9/1973 | Littman et al. | 235/150.1 |
| 3,812,533 | 5/1974 | Kimura et al. | 360/77 |
| 4,056,830 | 11/1977 | Smith | 360/77 |

*Primary Examiner*—Alfred H. Eddleman
*Attorney, Agent, or Firm*—Richard E. Cummins

[57] ABSTRACT

A sampled data positioning system for moving a member between positions in a minimum time employs a model of the physical system to overcome the low bandwidth constraints of fed back position and velocity samples. The model system is an approximate analog of the physical system and provides continuous pseudo position and velocity signals of high bandwidth. These are applied to a seek controller which generates an error signal between a desired reference velocity trajectory and the pseudo velocity signal. The error signal is fed back to the model system input and is also applied to control the physical system. The model velocity and position outputs are reset at sampling times to the values of the sampled velocity and position in the physical system.

27 Claims, 9 Drawing Figures

SAMPLED DATA POSITIONING SYSTEM EMPLOYING A MODEL OF THE PHYSICAL SYSTEM FOR TIME OPTIMAL CONTROL

BACKGROUND OF THE INVENTION

1. Field of the Invention

The present invention relates to positioning systems for moving a member between positions in a minimum time.

2. Description of the Prior Art

A typical positioning application to which the present invention relates is the positioning of a data recording head over a selected track of a magnetic disk file. Typical contemporary file systems provide positioning in two independent modes of operation, i.e., a seek mode and a track follow mode. One such system for controlling a disk file head access operation is described in an article entitled "Design of a Disk File Head-Positioning Servo" by R. K. Oswald, (IBM Journal of Research and Development, Nov. 1974, pp. 506–512). For the seek mode, the primary requirement has been to effect movement from an initial track position to a target track position in a minimum time. This has been accomplished conventionally by means of a derived continuous distance-to-go signal acting on a reference velocity curve generator which, via a high gain closed loop, forces the actual velocity of the system to follow the reference velocity trajectory of the curve generator.

The seek mode, therefore, is necessarily of wide bandwidth and as such is subject to the stability and error constraints of such systems. Conversely, the track-follow system is of narrow bandwidth since the primary requirement is to "lock" the system onto the target track and thereafter minimize positioning error caused by low frequency disturbances such as runout or windage.

This dichotomy of requirements has necessitated design of two independent systems operating from the same position and velocity error source. The wide band requirements of the seek system have forced this error source to be continuous with the consequence that a servo position reference data area remote from the information recording area has been provided in the form of either a separate servo disk, as described in the above referenced Oswald article, or separate servo band. Clearly it is technically desirable to provide the servo data contiguous with the recorded data and to remove the necessity for a remote servo data area. This can be accomplished by interspersing servo data with recorded data and thereby invoking a sampled-data approach to positioning of the recording apparatus. However, since direct head position and velocity information is only available at servo data sampling times, sampled systems are inherently of low bandwidth. The conventional approaches for minimum time track seek motion described above are thus not applicable for sampled data systems.

One approach to the problem of making the performance of a sampled system approach that of a continuous system is shown in U.S. Pat. application Ser. No. 811,350 by R. K. Oswald and commonly assigned with the present application. The system described employs concurrent feedforward and feedback control to move a member between positions in time optimal fashion. The feedforward control system provides coarse control and the feedback control system provides fine control to correct for deviations between the actual and a nominal system. The feedback loop may thus be of low bandwidth, such as in a sampled system. The feedforward control function represents the approximate input to an electromagnetic coil actuator of a nominal system required to move the member between positions in time optimal fashion.

The problems of low bandwidth in feedback control are also known in the process control art where they have been tackled by the employment of model systems. In an article on p. 98 of Vol. 1 of "Nonlinear and Adaptive Control Techniques" (Purdue University), a process control system is shown which employs a model of the process, responsive to command signals to provide a forward control signal to a "nonlinear trajectory algorithm" block and to provide a "predicted process state." The trajectory is added to a feedback control signal, developed by comparing a "process state." The sum is applied as a "control output" to the process. The parameters of the model are updated in response to the "process state" measurement. U.S. Pat. Nos. 3,601,588 (Bristol), 3,657,534 (Bakke) and 3,758,762 (Littman) all show various process control systems employing process models, some adaptive, broadly resembling the system shown in the Purdue article.

Patents exist in the aircraft control art which show so called model systems for producing a predicted system response to a command. Typical of these are U.S. Pat. Nos. 3,137,462 (Hendrick) and 3,221,229 (Kezer). In all of these patents, the predicted system response is compared with the actual measured system response and the difference used to control the parameters of the control system adaptively. Quantities controlled include servo amplifier gain, stabilization and directional control systems for the control surfaces.

SUMMARY OF THE INVENTION

It is an object of the present invention to provide a sampled data positioning system in which time optimal motion control is achieved.

It is a further object of the present invention to provide a positioning system in which a model system is employed to achieve time optimal motion control.

It is a still further object of the invention to provide a sampled data positioning system in which a model system provides position and velocity outputs for motion control which are reset by sampled actual position and velocity measurements.

These and other objects of the invention are achieved in a positioning system having a model system which is an approximate electrical analog of the physical system and which is responsive to the same control input as the physical system to generate continuous model position and velocity information. This model position and velocity information is applied to a seek controller employing a reference velocity curve generator; a velocity error signal is derived which represents the difference between model velocity and desired velocity. The error signal is used as an input to control the motor of the physical system and is simultaneously fed back to the analogous input of the model system. Since the model is only an approximation of the physical system, its position and velocity outputs are reset to actual position and velocity values when these are sampled by position and velocity transducers in the physical system.

The prior art systems mentioned above do not show the employment of a model system in a positioning application where the model produces pseudo position and velocity output signals. Nor do any of the prior art systems show model systems with feedback loops to their own inputs permitting the resetting of the model by resetting the model output signals (position and velocity) to the sampled values of the corresponding physical system quantities.

The employment of a model system in a sampled data positioning system according to the invention thus permits the performance of the sampled system to approach that of the continuous system. The model system continuously approximates the physical system to allow a high bandwidth time optimal control strategy. A simplified model system (nominally of second order) is permissible because the model system outputs are iteratively corrected by successive samples from the physical system. This correction method is novel in that the model output variables themselves are reset at sampling times to the corresponding physical system values. The model system thus tracks at sampling times the physical system and the physical system tracks, between samples, the model system.

BRIEF DESCRIPTION OF THE DRAWINGS

In FIG. 1 is shown, in block diagram form, a head positioning system according to the present invention. A physical system 10, details of which are shown in FIG. 2, comprises the heads and disks of a disk file and a motor for moving the heads between concentric data tracks on disks in response to a motor control signal $I_{SYS}$, applied to the input of the physical system. The disk file is of the sampled servo type wherein servo position reference information, located in sectors on the disk surface, defines the location of data tracks interspersed between the sectors. Details of the arrangement of data on the disk are shown in FIG. 5(a).

Figure 8:
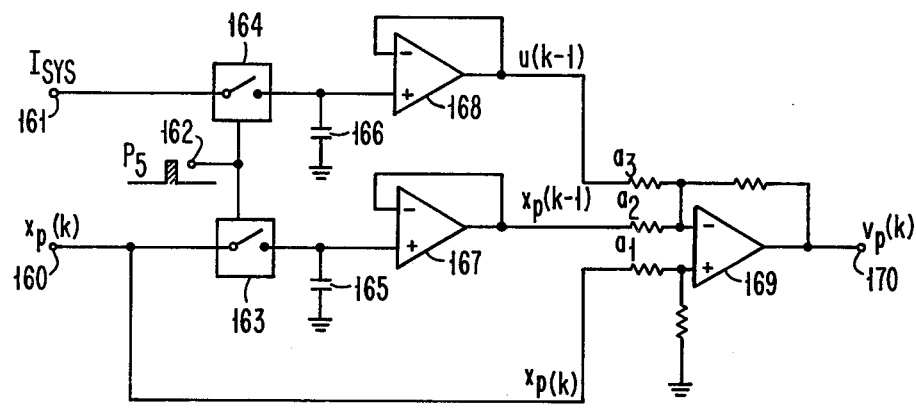
FIG. 8 is a circuit diagram of a sampled velocity detector circuit shown in FIG. 1.

Information on the position of the head is thus only available at sampling times when the servo sectors pass beneath the head. At such sampling times, signals from the head are applied to a position detector 11, details of which are shown in FIG. 6, which produces a sampled absolute position signal $x_p$. The absolute position signal is applied to a velocity detector 12, details of which are shown in FIG. 8, and which also receives the motor control signal $I_{SYS}$. The velocity detector produces a sampled velocity signal $v_p$ at the sampling times.

As explained above, sampled systems have an inherently low bandwidth which is incompatible with the high bandwidth requirements of a conventional time optimal motion control system employing a reference velocity curve generator responsive to a fed back actual position signal. Consequently, the present invention employs a model system 13, shown in detail in FIG. 3, which is an approximate analog of the physical system. The model system is responsive to a model control signal $I_{MOD}$, which is normally the same as $I_{SYS}$, to generate continuous high bandwidth pseudo position and velocity signals $x_m$ and $v_m$. These model positions and velocity outputs are applied to a seek controller 14, shown in detail in FIG. 3,, which functions in a conventional manner to produce a reference velocity signal. This signal is compared with the model velocity signal $v_m$ to produce a difference signal $I_V$.

The difference signal $I_V$ is applied to a summing junction 15 which also receives the output of a saturation loop within the model applied subtractively on line 16. The output of the saturation loop is zero for small values of $I_V$ and non-zero for larger values. The effect of the loop is to simulate in the model saturation of the motor driver in the physical system. The output of junction 15 is the model control signal $I_{MOD}$ which is fed back to the model system and is also applied as $I_{SYS}$ to control the physical system by way of a second summing junction 17. $I_{SYS}$ differs from $I_{MOD}$ only during track following operations, when the sampled position $x_p$ and velocity $v_p$ are fed back through a sampled compensation circuit 18 through a switch 19 to the second summing junction 17. During track following, $I_{MOD}$ is substantially zero.

Returning to the track seek motion control, whenever the actual head position $x_p$ and velocity $v_p$ are sampled, the sampled values are applied to an output reset portion 20 of the model system. A reset pulse applied on line 21 causes the model position and velocity outputs $x_m$ and $v_m$ to be reset to the values $x_p$ and $v_p$. Thus the inaccuracy inherent in the fact that the model is only an approximation of the physical system is repeatedly corrected at each sampling.

Figure 1:
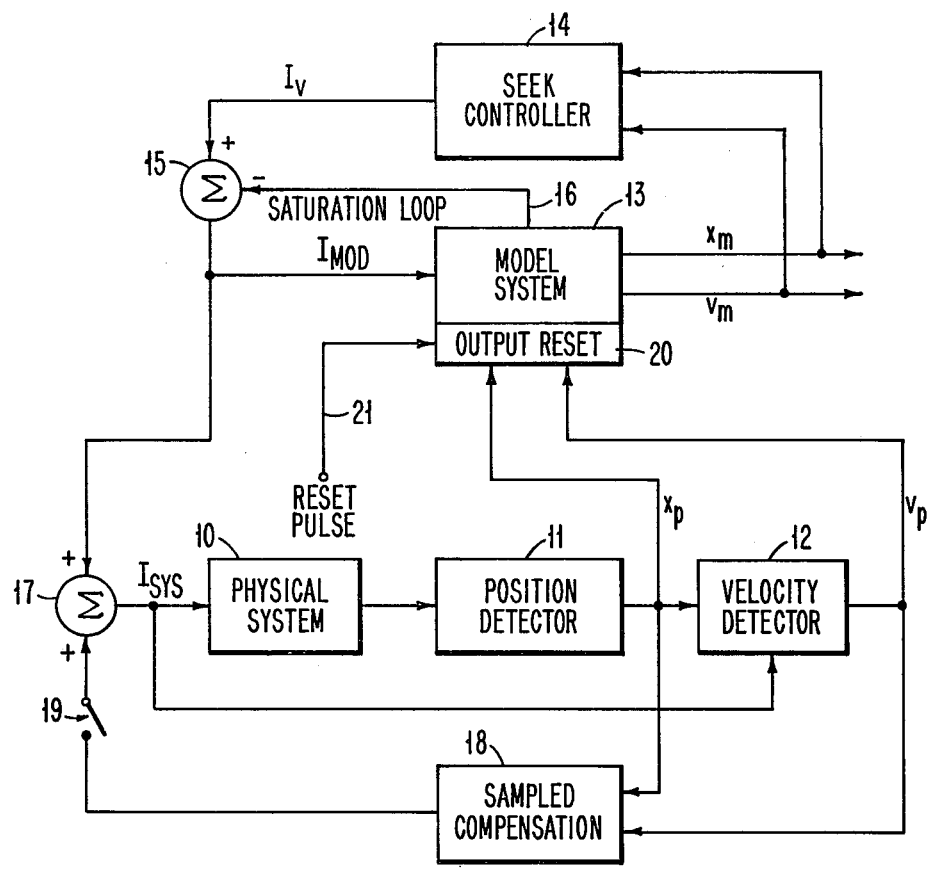
FIG. 1 shows an overall schematic block diagram of a disk file head positioning system according to the present invention.
Figure 2:
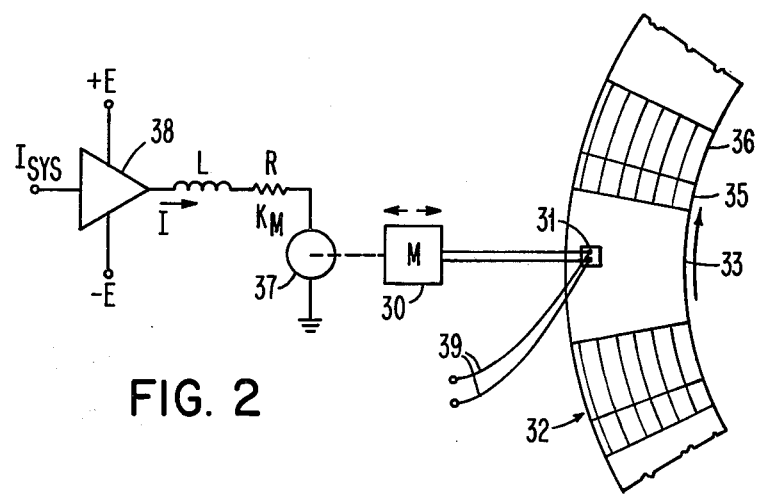
FIG. 2 shows schematically the physical arrangement of those portions of the disk file related to head positioning.
Figure 5:
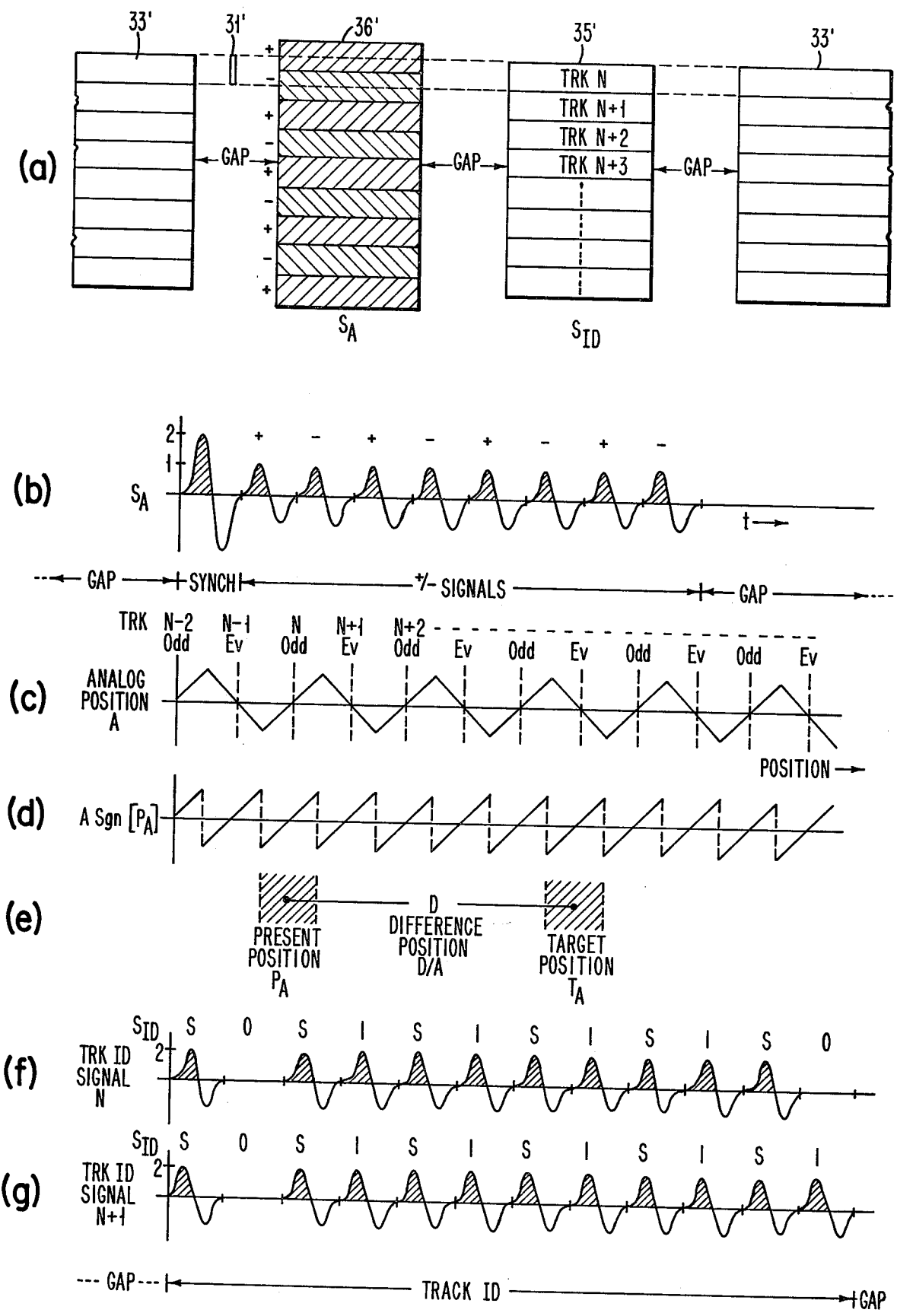
FIGS. 5(a) through (g) shows various signals read back by the head from analog servo and track identifying regions of the disk and shows various position signals derived therefrom.

A schematic representation of the physical system 10 of FIG. 1 is shown in FIG. 2. A carriage 30 of mass M supports a read/write transducer 31 for movement radially on a magnetic recording disk 32, only a portion of which is shown. The disk 32 has data tracks 33, and servo sectors comprising both track identifying portions 35 and analog position reference servo tracks 36. The data tracks 33 are centered on the boundaries between servo tracks 36. The carriage 30 is driven by an electromagnetic voice coil motor 37, of motor constant $K_m$. The motor coil is represented electrically by an inductance L and a resistance R. The motor control signal $I_{SYS}$ is applied to a transconductance power amplifier 38 of gain $K_A$ which provides corresponding drive current I to the motor coil. The electrical signals read back by transducer 31 appear on output leads 39. These signals and their further processing are shown in FIGS. 5 and 6.

For unsaturated operation the equation governing the physical system is:

(1) $M \ddot{x}_p(t) = K_A K_m I_{SYS}(t)$ where $x_p$ is the actual head position.

Figure 3:
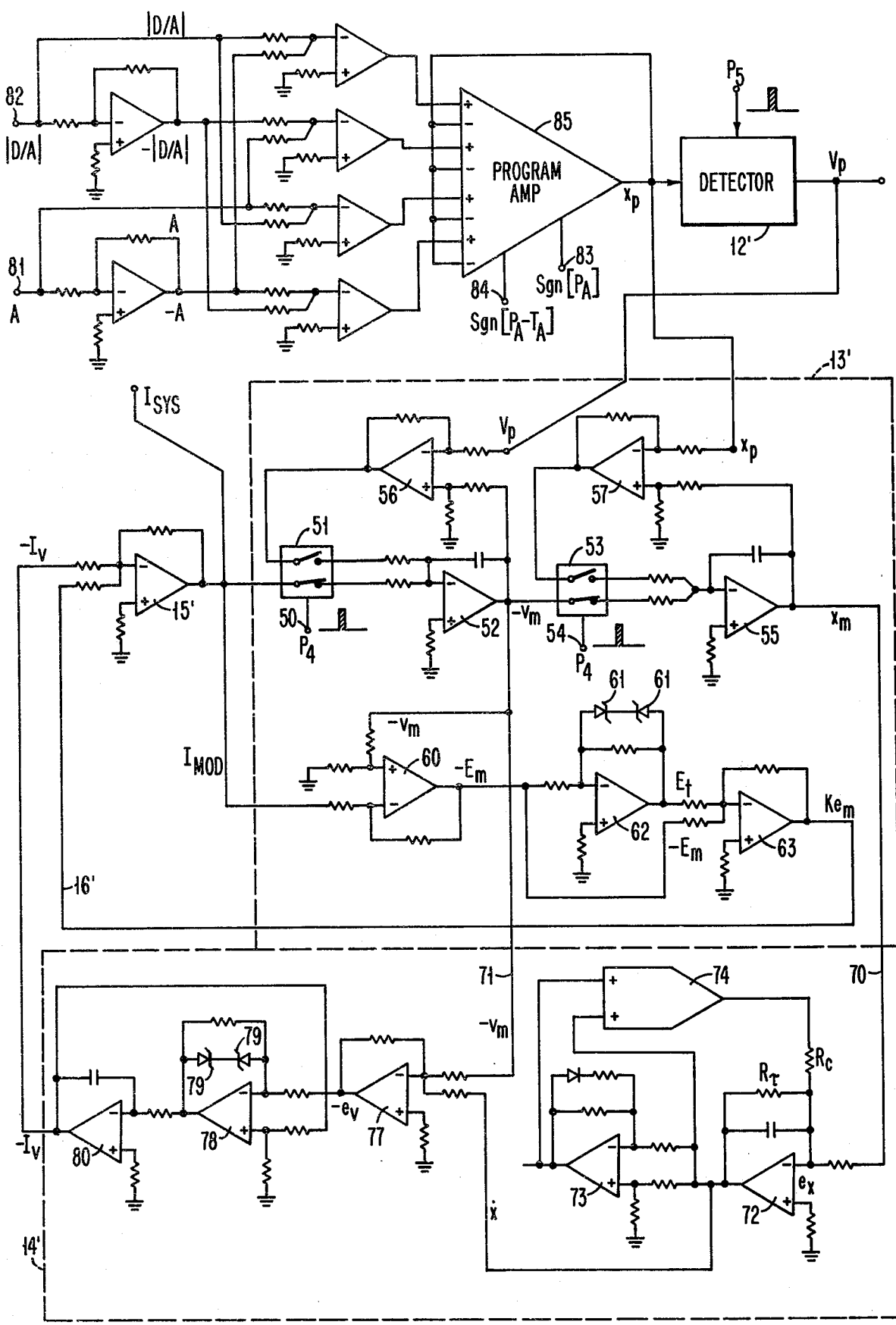
FIG. 3 shows a circuit diagram of a positioning system employing a model of the physical system according to the present invention.

For saturated operation, the governing equations are:

(2) $E (\text{sign } v_p(t)) = L \, dI(t)/dt + RI(t) + K_m v_p(t)$ and (3) $M \ddot{x}_p(t) = K_m I_{SYS}(t)$ The model system 13 of FIG. 1 is shown in detail in box 13' of FIG. 3. Amplifier 15' corresponds to summing junction 15 of FIG. 1 and receives a signal $-I_v$ from a seek controller 14' corresponding to seek controller 14 of FIG. 1. The amplifier 15' also receives an input on line 16' for simulating the effect of saturation in the motor drive circuit. The output of the amplifier 15' is a current $I_{MOD}$ to the model which is also applied as $I_{SYS}$ to the physical system. In the absence of a velocity reset pulse $P_4$ at terminal 50 of an analog switch 51, the current $I_{MOD}$ is applied to an integrating amplifier 52. Since, by equation (1) above, the current of a motor is directly proportional to its acceleration, the integral of current represents velocity, in this case model velocity $-v_m$. An analog switch 53, also responsive to the absence of reset pulse $P_4$ at a terminal 54, applies the velocity signal $v_m$ to a second integrating amplifier 55. Integration of the model velocity signal $v_m$ produces the model position signal $x_m$. The two integrators 52 and 55 are thus arranged to respond to a model control signal, representing motor current, by producing continuous model velocity and position signals $v_m$ and $x_m$ corresponding approximately to the velocity and position of the transducer 31 in the physical system.

When reset pulses $P_4$ are applied to terminals 50 and 54 at sample times, the actual values of velocity $v_p$ and position $x_p$ from the physical system are applied through amplifiers 56 and 57 and switches 51 and 53 to reset the model outputs. Amplifiers 56 and 57 are connected in high gain feedback configuration around respective integrators to produce a rapid resetting.

The remaining portion of the model system is the saturation loop. If equation (2) above is simplified by omission of the inductive term, then for the model system:

(4) $E_m = K_m v_m + I_{MOD} R$.

This expression relates the model control signal $I_{MOD}$ and velocity $v_m$ to a hypothetical model power supply voltage $E_m$. The effect of the saturation loop is to keep $I_{MOD}$ below a threshold level above which $E_m$ would exceed the available power supply voltage $E$ in the physical system, i.e. to model saturation of power amplifier 38, FIG. 2.

This is achieved by applying $I_{MOD}$ and $v_m$, suitably scaled, to a summing amplifier 60 whose output represents model power supply voltage $E_m$. The model power supply voltage signal is applied to a limiter circuit comprising Zener diodes 61 and amplifier 62. When $E_m$ is below the Zener threshold it is passed unchanged to a further summing amplifier 63. When $E_m$ exceeds the threshold the output from the limiter is equal to the threshold, $E_t$. $E_m$ is applied directly to amplifier 63 where the output of limiter 62 is subtracted from it. The difference $e_m = E_m - E_t$ is scaled by a factor $K$ and applied on line 16' as a subtractive input to summing amplifier 15'. Thus $I_{MOD}$ is limited by a saturation modelling effect so that it cannot exceed what is attainable in the physical system.

Turning now to the seek controller 14', the model position and velocity outputs $x_m$ and $v_m$ are applied to controller 14' on lines 70 and 71. The line 70 is the input to a curve generator circuit for producing a desired reference velocity $\dot{x}$ from the position input $x_m$. A simplified relationship between $\dot{x}$ and $x_m$ for a minimum time control strategy is:

$$-x_m = C\dot{x}|\dot{x}| + \tau \dot{x}$$

This corresponds to the well known square root dependence of velocity on distance-to-go for maximum constant deceleration, with the inclusion of a linear term for stability as $x_m$ tends to zero.

To produce an output signal $\dot{x}$ according to the above relationship, the model position signal $x_m$ is amplified in a forward gain amplifier 72 of time constant $\tau$, providing the linear term. A high gain fast time constant feedback loop is connected around amplifier 72 to provide the square law relationship. The modulus $\dot{x}$ is obtained by an absolute value circuit including amplifier 73 and multiplied with $\dot{x}$ in multiplier 74. Thus the model position error $e_x$ is nulled in the high gain loop to produce the desired curve of velocity $\dot{x}$ vs. $x_m$.

Figure 4:
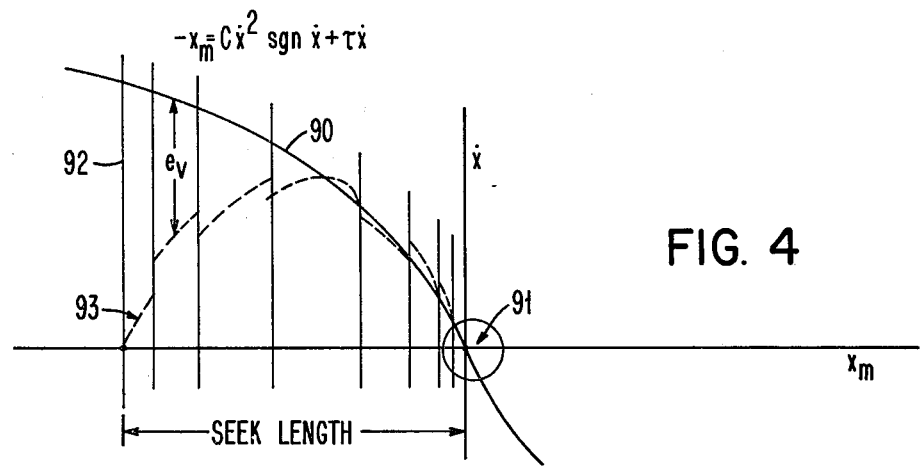
FIG. 4 illustrates the variation of pseudo position and velocity signals generated by the model system of FIG. 3.

The output curve showing the dependence of desired velocity $\dot{x}$ upon $x_m$ is the continuous line 90 in FIG. 4. The curve is predominantly parabolic, according to the square root relationship, but includes, as indicated above, a linear portion near the origin within circle 91.

The seek controller 14' compares the desired velocity trajectory $\dot{x}$ with the model velocity $v_m$ in summing amplifier 77. The difference $e_v$ between $v_m$ and $\dot{x}$ is the velocity error. Dashed portions 93 in FIG. 4 show the model velocity $v_m$ trajectory throughout the seek motion. The velocity error $e_v$ is the basis of the control signal $I_v$ fed back to the model and to the physical system. The velocity error $e_v$ is the difference in ordinate between the curves 93 and 90 in FIG. 4. It can be seen that this difference is large initially and also changes abruptly as $x_m$ and $v_m$ are reset at sampling times indicated by lines 92. If $e_v$ were applied directly, high frequency components would appear at the input to the physical system which would excite high frequency mechanical resonances. To inhibit these high frequency components, a rate limiting loop is employed. The rate limiting circuitry comprises a limiter, including amplifier 78 and Zener diodes 79, and an integrating amplifier 80, all in a high gain fast response loop configuration. The output of the rate limiting circuitry is the current $I_v$ to the summing junction 15'.

It should be emphasized that this control current $I_v$ is produced not as in conventional systems, by a comparison of actual head velocity with a desired velocity trajectory, but by a comparision of such a trajectory with a pseudo head velocity signal from a model of the physical system. The employment of such a model permits the use of a high bandwidth control loop in a system which has inherently low bandwidth feedback of actual position and velocity, such as the sampled servo head positioning system described.

It remains to describe the details of the position detector 11 and the velocity detector 12 of FIG. 1. In order to do this it is necessary to examine more carefully the layout of information on the disk 32, FIG. 2, and the form of the signals read back by the transducer 31. FIG. 5(a) shows in expanded form the layout of data on the disk. This data consists of read/write data 33', analog servo data 36' and track identifying information 35'. These three types of data are located in sectors on the disk surface which are separated by gaps. The analog servo data consists of a pattern of odd and even servo tracks the boundaries between which coincide with the data track centers.

When head 31' is located in the position shown in FIG. 5(a), i.e. precisely over a data track N, it will read part of an even servo track and part of an odd one. The signal $S_A$ from the head 31' read back from the servo tracks is shown in FIG. 5(b). Apart from commonly aligned synchronizing dibits at the beginning of the analog servo sectors 36', the even tracks have recorded thereon four (+) unipolar dibits of one phase and the odd tracks four (−) unipolar dibits of another phase, as indicated by the plus minus signs in FIG. 5(b). An analog position signal A is derived, as will be shown in FIG. 6(b), by comparing the contributions of odd and even tracks. This analog position signal A, of course, only represents the deviation of the head from the nearest servo track boundary and does not represent the absolute position of the head with respect to the target track. During the seek motion while crossing successive tracks the analog position signal A has the form shown in FIG. 5(c).

The track identifying information 35' is read back by the heads as dibit signals $S_{ID}$ as shown, for two tracks N and N + 1 in FIGS. 5(e) and 5(f). Tracks are digitally identified by appropriate coding of dipulses as shown. Thus track N is coded as 011110 and track N + 1 is coded as 011111.

Figure 6A:
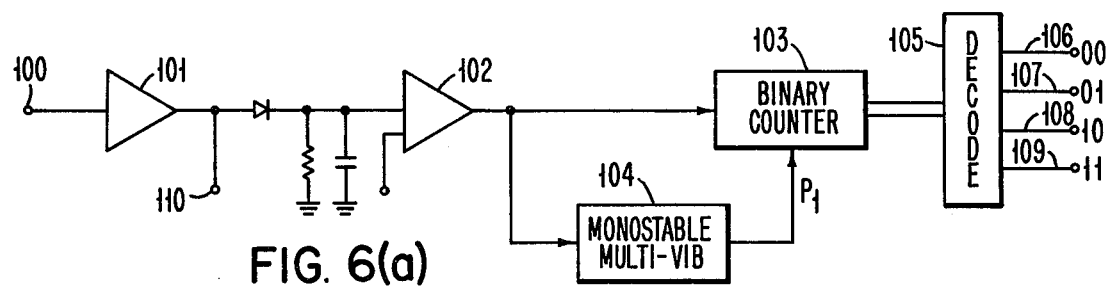
FIG. 6(a) shows clock circuitry for producing timing signals employed in the position detection circuitry of FIG. 1.
Figure 6B:
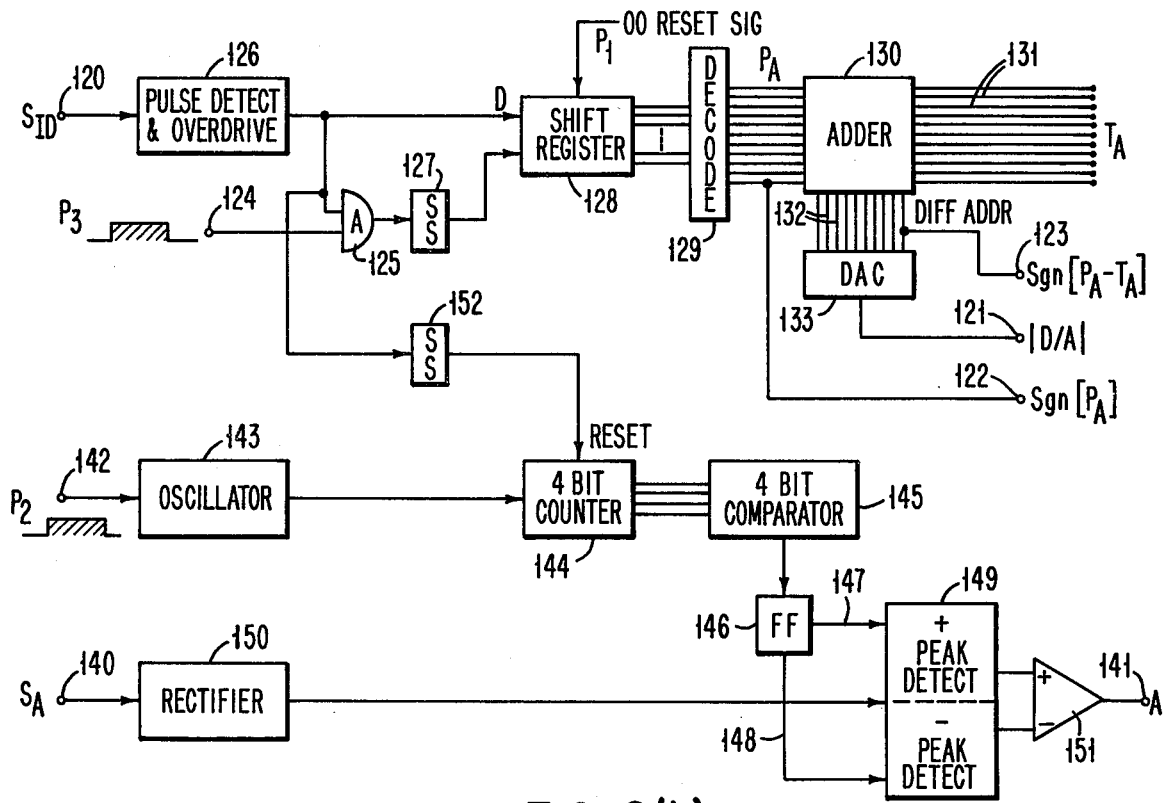
FIG. 6(b) shows circuit details of the position detection circuitry of FIG. 1.

The position detect circuitry comprises clock circuitry shown in FIG. 6(a) and position signal generating circuitry shown in FIG. 6(b). The clock circuitry receives at terminal 100 the composite signal from head 31, FIG. 2. This consists of read/write data signals, track identifying signals $S_{ID}$ (FIG. 5(f) and (g)) and analog servo signals $S_A$ (FIG. 5(b)) repeated cyclically and with gaps in between each type of signal.

Figure 7:
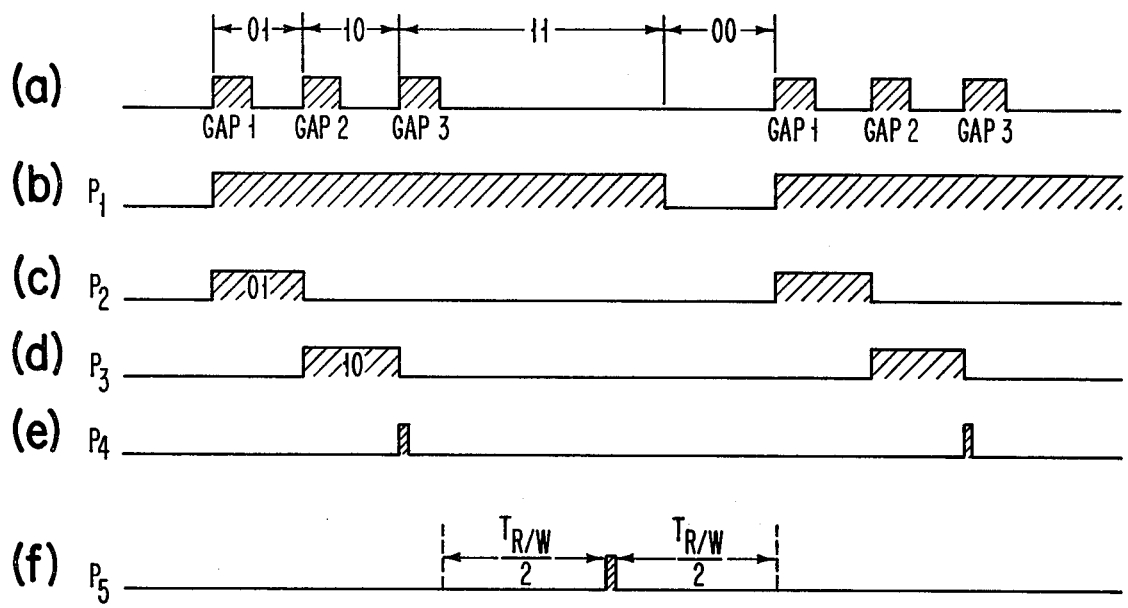
FIGS. 7(a) through (f) are timing diagrams showing the timing of various gating pulses generated by the circuitry of FIG. 6.

The composite signal is amplified in video amplifier 101 and applied to a peak detect circuit in which the peak amplitude is compared with an applied reference level in comparator 102. The peak detector functions to detect the gaps in the composite head signal. The gaps are shown in FIG. 7(a) and are counted by binary counter 103. A monostable multivibrator 104 is triggered by Gap 1 and its output $P_1$, shown in FIG. 7(b) is used to reset the counter to state 00 prior to the termination of the read/write data.

The occurrence of gap 1 at the end of a read/write data sector sets the counter 103 to state 01. Gap 2 between the read/write and servo analog data sets the counter to state 10. Gap 3 between the servo analog data and track identifying data sets the counter to state 11. The counter outputs are decoded by decoder 105 to produce timing or gating signals on lines 106-109. A reset signal is produced on line 106 at the trailing edge of the signal $P_1$ from the multivibrator 104 to indicate the commencement of the 00 state of counter 103. A servo analog gating signal $P_2$ (FIG. 7(c)) is produced on line 107 for the entire duration of the 01 state of the counter. A track identifier gating signal $P_3$ (FIG. 7(d)) is produced on line 108 for the entire duration of the 10 state of the counter. An output reset pulse $P_4$ (FIG. 7(e)) is produced by a single shot (not shown) in response to the activation of line 109 at the commencement of the 11 state of counter 103. The signal on line 109 corresponding to the 11 state of the counter identifies the read/write data portions of the signal which are gated by circuitry (not shown) to associated data processing apparatus. Finally, a signal $P_5$ (FIG. 7(f)) for controlling the velocity detector circuit shown in FIG. 8 is produced by delay circuitry (not shown) at the mid-point of the read/write data sectors.

The actual circuitry for generating the position signal $x_p$ is shown in IFG. 6(b) and also partly in FIG. 3. In FIG. 6(b), the amplified composite head signal from output terminal 110 of FIG. 6(a) is applied to input terminals 120 and 140. Input terminal 120 is connected to a first channel for deriving the track address and producing from it a digital to analog output D/A at terminal 121 corresponding to the integral number of tracks between a present position $P_A$ and a target position $T_A$ (see also FIG. 5(e)). Other outputs "Sgn $(P_A)$" and "Sgn $(P_A - T_A)$" are also produced at terminals 122 and 123 respectively. Input terminal 140 is connected to a second channel for deriving the analog position signal A (FIG. 5(c)) and supplying it to an output 141.

To enable the first channel, the signal $P_3$ is applied by way of terminal 124 to and AND gate 125. The AND gate 125 also receives pulses detected from the read back signal from head 31 by pulse detect and overdrive circuit 126. The application of gating pulse $P_3$ ensures that the first channel is enabled only when the track identifying information $S_{ID}$ is present. A single shot circuit 127 responds to the tracking edges of the synchronizing pulses S in the track ID (FIGS. 5(f) and (g)) to generate a window for gating the data bits alone of the track ID into a ten bit shift register 128. The shift register 128 is reset before each track ID by the reset signal from output 106 of decoder 105, corresponding to the trailing edge of signal $P_1$.

The shift register output is a 10 bit Gray coded signal and is applied to a decoder 129 which converts it to binary coded decimal. The output of the decoder 129 is the present position $P_A$ of the head 31 in digital form. The lowest order output line provides the Sgn $(P_A)$ output at terminal 122 indicating whether the track over which the head is located is odd or even. The digital position $P_A$ is applied to an adder 130 which also receives the target address $T_A$ as input on lines 131. The adder computes the difference $P_A - T_A$ and outputs it on lines 132 to a digital to analog converter 133. The right hand line of 132 indicates the algebraic sign of the difference and is connected to terminal 123. The digital to analog converter converts the digital position $P_A$ of the head relative to the target track to a positive analog D/A signal which is output at terminal 121.

The second channel of the position signal generating circuitry of FIG. 6(b) is enabled by receipt of the gating signal $P_2$ at the terminal 142. This signal activates an oscillator 143 which produces pulses at sixteen times the frequency of the dibits of the analog servo signal $S_A$ (FIG. 5(b)) and synchronized therewith. The oscillator output drives 4 bit counter 144 which together with a 4 bit comparator 145 and flip flop 146 produces gating pulses on lines 147 and 148 to separate the odd and even dibits; the gating pulses occur at 1/16 times the rate of the dibit pulses. Dual peak detection circuit 149 is enabled by gating pulses on lines 147 and 148 to detect and hold the peak values of the dibits from the odd and even tracks respectively. The analog servo signal $S_A$ is applied to the peak detector 149 after first being rectified by rectifier 150. The difference between the signals from the odd and even tracks is determined by difference amplifier 151 whose output is the analog position signal A (FIG. 5(c)). The four bit counter 144 is reset by the trailing output of a single shot 152, triggered by the output of pulse detector 126.

The final portion of the position detection circuitry is shown in FIG. 3. The outputs A, D/A, Sgn ($P_A$) and Sgn ($P_A - T_A$) from the circuit of FIG. 6(b) are applied to inputs 81-84, respectively of a circuit including programmable amplifier 85. One such amplifier which is commercially available is the HA 2400. The amplifier produces the absolute analog position $x_p$ of the head 31 relative to the target track according to the following algorithm:

$$x_p = D/A \text{ Sgn } (P_A - T_A) + A \text{ Sgn } (P_A)$$

The first quantity represents the position to the nearest integral number of tracks with a sign determined by the direction of displacement of the head from the target track. The second quantity, shown in FIG. 5(d), represents the incremental deviation from the nearest track center irrespective of whether the track is odd or even.

Finally, the velocity detector 12' is shown in detail in FIG. 8. It receives the position input $x_p$ from the programmable amplifier 85 (FIG. 3) at terminal 160. The position input $x_p$ is derived at a sampling time determined by the timing signals $P_2$ and $P_3$, as explained in connection with FIG. 6. The sampled position input is here expressed as $x_p(k)$ indicating that it is the kth such position sample. A second input to a terminal 161 is the motor control signal $I_{SYS}$. A third input is the sampling signal $P_5$ at terminal 162. The sampling pulse $P_5$ occurs in the middle of each read/write data sector when $x_p(k)$ is in a steady state, and also to provide for averaging of an $I_{SYS}$ which may vary between samples. Generation of $P_5$ (not shown) is accomplished by timing from the trailing edge of $P_3$. Whenever the sampling pulse $P_5$ appears, analog switches 163 and 164 are closed to connect $x_p(k)$ and $I_{SYS}$ to sample and hold circuits including capacitors 165 and 166 and amplifiers 167 and 168. Thus the amplifier 167 provides the value $x_p(k-1)$ of the preceding sample and the amplifier 168 provides the instantaneous value $u(k-1)$ of the motor current related control signal $I_{SYS}$ at the $P_5$ time between the (k−1)th and kth position samples. These values together with the current position sample $x_p(k)$ are applied to a difference amplifier 169 after suitable resistive scaling by factors $a_1$, $a_2$ and $a_3$. The desired velocity sample $v_p(k)$ at the output terminal 170 is related to the inputs by the formula:

$$v_p(k) = a_1 x_p(k) - a_2 x_p(k-1) - a_3 u(k-1)$$

That is to say the sampled velocity at the time of the kth position sample is the change in position during a fixed time interval (between samples) corrected by an acceleration factor derived from motor current.

Various changes may, of course, be made to the disk file head positioning system described without departing from the essential teachings of the invention. For example, different servo patterns may be used as disclosed in the referenced Oswald article. The velocity detector described need not be directly responsive to the position detector output but could instead be an independent tachometer. Although a separate track following system is indicated here as being preferred, such a system may be dispensed with entirely as the seek system will continue to follow a track when the model has reached its null state ($x_m$ and $v_m$ both equal to zero).

Finally, it will be recognized by one skilled in the art that the invention is applicable not only to disk file head positioning but also generally to other positioning systems.

What is claimed is:

1. A positioning system for moving a member between a present and a target position in a minimum time, comprising:
    a physical system having
    a motor for moving said member in response to motor control signals;
    clocking means for generating timing signals;
    position sampling means responsive to said timing signals to provide a sampled position signal representing the position of said member at a sampling time defined by said timing signals; and
    velocity sampling means responsive to said timing signals to provide a sampled velocity signal representing the velocity of said member at a sampling time defined by said timing signals;
    said system further comprising;
    a model system which is an approximate electrical analog of the physical system and is responsive to a model control signal to provide a continuously available model output position signal and a continuously available model output velocity signal;
    a reference velocity signal generating means connected to receive said model position signal and being responsive thereto to provide a reference velocity signal representative of the required velocity of said member, at a position corresponding to that indicated by said model position signal, to permit said member to decelerate to a state of rest at said target position in a minimum time subject to the physical constraints on the system;
    control signal generating means for comparing said model velocity and reference velocity signals to produce a velocity error control signal representative of their difference;
    means for deriving from said velocity error control signal a motor control signal for said physical system and a model control signal for said model system; and
    means for resetting said model position and velocity signals, in response to predetermined ones of said timing signals, to the values of said sampled position and velocity signals.

2. A positioning system according to claim 1 wherein said motor is an electric motor and said model and motor control signals represent desired motor drive current;
    said model system comprising first integration means arranged to integrate said model control signal to provide said model velocity signal;
    and second integration means arranged to integrate said model velocity signal to provide said model position signal.

3. A positioning system according to claim 2 wherein said means for resetting includes a first high gain reset loop about said first integration means to which said sampled velocity signal is applied, said reset loop being responsive to the application of a reset pulse thereto to reset the output of said first integration means to the value of said sampled velocity signal;
    said means for resetting further including a second high gain reset loop about said second integration means to which said sampled position signal is applied, said second reset loop being responsive to the application of a reset pulse thereto to reset the output of said second integration means to the value of said sampled position signal.

4. A positioning system according to claim 2 wherein said model system includes a saturation simulating means for simulating in the model system the effect of motor current amplifier saturation in the physical system.

5. A positioning system according to claim 4 wherein said means for deriving said motor and model control signals includes a first summing junction, connected to receive said velocity error control signal and a subtractive input, said first summing junction producing at an output connected to said first integration means, a signal consituting both said motor and said model control signals, said saturation simulating means being responsive to said model control signal from said first summing junction output and to said model velocity signal to derive therefrom said subtractive input to said first summing junction to simulate the effects of saturation.

6. A positioning system according to claim 5 including means for combining said model control signal and said model velocity signal to form a representation of power supply voltage;
a limiter for limiting said representation within predefined limits; and
a second summing junction for determining any difference between said limited and actual representation, said second summing junction output being fed as said subtractive input to said first summing junction.

7. A positioning system according to claim 1 wherein said reference velocity signal generating means comprises a summing junction connected to receive said model position signal as input;
an integrating amplifier connected between said summing junction and an output node; and
a negative feedback loop between said output node and said summing junction, said feedback loop including a multiplier for multiplying the signal at said output node by its modulus, whereby said output node signal consititutes said reference velocity signal.

8. A positioning system according to claim 7 wherein said reference velocity signal generating means further comprises:
a second negative feedback loop between said output node and said summing junction, said second negative feedback loop including a resistive element.

9. A positioning system according to claim 7 in which said control signal generating means comprises rate limiting means for limiting the rate of change of said control signal.

10. A head positioning system for moving read/write heads between data tracks of a disk file of the type in which servo positioning information is located in sectors on the disk surface to define the position of said data tracks which are interspersed with said servo information;
said positioning system comprising a physical system having a motor for moving said heads radially over said disk in response to motor control signals;
clocking means for generating timing signals synchronized with the passage of servo sectors beneath said heads as said disk rotates;
position sampling means responsive to said timing signals to provide a sampled position signal representing the radial position of said heads with respect to a target track at a sampling time defined by said timing signals;
velocity sampling means responsive to said timing signals to provide a sampled signal representing the velocity of said heads radially of the disk at a sampling time defined by said timing signals;
said system further comprising:
a model system which is an approximate electrical analog of the physical system and is responsive to a model control signal to provide a continuously available model position signal at a position output and a continuously available model velocity signal at a velocity output;
a reference velocity signal generating means connected to receive said model position signal and being responsive thereto to provide a reference velocity signal representative of the required velocity of said heads, at a position corresponding to that indicated by said model position signal, to permit said heads to decelerate to a state of rest at a target track in a minimum time, subject to the physical constraints on the system;
control signal generating means for comparing said model velocity and reference velocity signals to produce a velocity error control signal representative of their difference;
means for deriving from said velocity error control signal a motor control signal for said physical system and a model control signal for said model system;
and means for resetting said model position and velocity signals in response to predetermined ones of said timing signals to the values of said sampled position and velocity signals.

11. A head positioning system according to claim 10 wherein said motor is an electric motor and said model and motor control signals represent desired motor drive current;
said model system comprising first integration means arranged to integrate said model control signal to provide said model velocity signal; and
second integration means arranged to integrate said model velocity signal to provide said model position signal.

12. A head positioning system according to claim 11 wherein said servo positioning information comprises digitally coded track identifying information and an analog servo pattern,
said position sampling means comprising:
coarse position error signal generating means responsive to said track identifying information and to said target track address to provide an analog coarse position error signal representing the integral number of tracks to go;
fine position error generating means responsive to said analog servo pattern to generate a fine position error signal representing distance from the nearest track center;
and means for combining said coarse and fine position error signals to produce an absolute analog position error signal.

13. A head positioning system according to claim 12 wherein said clocking means is connected to receive readback signals from said heads and includes means responsive to predetermined unique characteristics of said readback signals to generate said timing signals.

14. A head positioning system according to claim 13 wherein said predetermined characteristics are gaps in said readback signals, said means responsive to predetermined unique characteristics including gap detection circuitry.

15. A head positioning system according to claim 14 wherein said gaps are located between said track identifying information and said servo pattern and between said servo positioning information and said data tracks;
said clocking means including a counter to count said gaps;
a decoder decoding said counter output to produce for respective counts, a first timing signal concurrent with passage of said analog servo pattern beneath said head, a second timing signal concurrent with passage of said track identifying information beneath said head and a reset timing signal subsequent to said first and second timing signals, for application to said resetting means;
said clocking means including counter resetting means for resetting said counter after generation of said reset timing signal by said decoder.

16. A head positioning system according to claim 11 wherein said means for resetting includes a first high gain reset loop about said first integration means to which said sampled velocity signal is applied, said reset loop being responsive to the application of a reset pulse thereto to reset the output of said first integration means to the value of said sampled velocity signal;
said means for resetting further including a second high gain reset loop about said second integration means to which said sampled position signal is applied, said second reset loop being responsive to the application of a reset pulse thereto to reset the output of said second integration means to the value of said sampled position signal.

17. A head positioning system according to claim 11 wherein said model system includes a saturation simulating means for simulating the effect of motor current saturation in the model system.

18. A head positioning system according to claim 17 wherein said means for deriving said motor and model control signals includes a first summing junction, connected to receive said velocity error control signal and a subtractive input;
said first summing functions producing at an output connected to said first integration means, a signal constituting both said motor and said model control signals, said saturation simulating means being responsive to said model control signal from said first summing junction output and to said model velocity signal to derive therefrom said subtractive input to said first summing junction to simulate the effects of saturation.

19. A head positioning system according to claim 18 including means for combining said model control signal and said model velocity signal to form a representation of power supply voltage;
a limiter for limiting said representation within predefined limits; and
a second summing junction for determining any difference between said limited and actual representation, said second summing junction output being fed as said subtractive input to said first summing junction.

20. A head positioning system according to claim 10 wherein said reference velocity signal generating means comprises:
a summing junction connected to receive said model position signal as input;
an integrating amplifier connected between said summing junction and an output node; and
a negative feedback loop between said output node and said summing junction, said feedback loop including a multiplier for multiplying the signal at said output node by its modulus, whereby said output node signal constitutes said reference velocity signal.

21. A head positioning system according to claim 20 wherein said reference velocity signal generating means further comprises:
a second negative feedback loop between said output node and said summing junction, said second negative feedback loop including a resistive element.

22. A head positioning system according to claim 21 in which said control signal generating means comprises rate limiting means for limiting the rate of change of said control signal.

23. A head positioning system according to claim 10 wherein said velocity sampling means is connected to receive said sampled position signals from said position sampling means and includes velocity signal generating means responsive to two successive position samples.

24. A head positioning system according to claim 23 wherein said velocity sampling means is connected to receive said motor control signal, said generating means being further responsive to said motor control signal to generate said sampled velocity signal.

25. A head positioning system according to claim 24 wherein said velocity sampling means further includes storing means responsive to predetermined ones of said timing signals to store the instantaneous values of said sampled position signal and said motor control signal, said velocity signal generating means being connected to receive said stored values and being further connected to receive said sampled position signals independently of said storing means.

26. In combination with a sampled data positioning system for moving a member between positions in a minimum time in response to an input control signal,
said sampled data positioning system including circuitry for generating first and second output signals corresponding respectively to the current position and velocity of said member at preselected sampling times,
a model system which is an approximate analog of said physical system for generating said input control signal to said sampled data positioning system,
said model system including circuitry for generating third and fourth output signals corresponding respectively to the current position and velocity of said member in said model system,
circuitry in said model system responsive to said third and fourth signals for generating said input control signal to said model system, and
means connected to both systems for
periodically resetting the values of said third and fourth signals with the current values of said first and second signals respectively, and
supplying the said input control signal in parallel to said physical system whereby the model system tracks the physical system at said sampling times and said physical system tracks said model system between said sampling times.

27. A method of generating an input control signal for a physical system in which the movement of a member between first and second positions is controlled in accordance with said input control signal to minimize the time of said movement comprising;

generating at preselected times a first signal which represents the current position of said member, generating at said preselected times a second signal which represents the current velocity of said member, generating a third signal which continuously represents the position of said member in a model system which is an analog of said physical system, generating a fourth signal which continually represents the velocity of said member in said model system, resetting the values of said third and fourth signals with the values of said first and second signals respectively during said preselected times, generating said input control signal from said third and fourth output signals, and sypplying said input control signal to both said model system and said physical system to cause said model system to track said physical system during said preselected times and said physical system to track said model system between said preselected times.

* * * * *